US012654667B2

(12) United States Patent
Ganzel

(10) Patent No.: US 12,654,667 B2
(45) Date of Patent: Jun. 16, 2026

(54) VENTED VALVE AND BRAKE SYSTEM USING SAME

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 504 days.

(21) Appl. No.: 18/447,609

(22) Filed: Aug. 10, 2023

(65) Prior Publication Data

US 2024/0294156 A1 Sep. 5, 2024

Related U.S. Application Data

(60) Provisional application No. 63/450,461, filed on Mar. 7, 2023, provisional application No. 63/449,670, filed on Mar. 3, 2023, provisional application No. 63/449,464, filed on Mar. 2, 2023.

(51) Int. Cl.
| | |
|---|---|
| *B60T 11/30* | (2006.01) |
| *F16K 1/14* | (2006.01) |
| *F16K 5/02* | (2006.01) |

(52) U.S. Cl.
CPC ................. B60T 11/30 (2013.01); *F16K 1/14* (2013.01); *F16K 5/02* (2013.01)

(58) Field of Classification Search
CPC ........ B60T 8/26; B60T 8/1831; B60T 8/1881;
B60T 11/30; B60T 17/222; B60T 17/22;
B60T 13/142; B60T 13/148; B60T 15/02;
F16K 1/14; F16K 1/32; F16K 1/36; F16K
1/46; F16K 5/02; F16K 24/04; F16L
55/07; F15B 21/044
USPC ........................................................ 188/352
See application file for complete search history.

(56) References Cited

U.S. PATENT DOCUMENTS

| | | | | |
|---|---|---|---|---|
| 4,265,493 A | * | 5/1981 | Ryuichi ................. | B60T 8/282 |
| | | | | 303/9.68 |
| 4,560,208 A | * | 12/1985 | Kubota ................... | B60T 11/34 |
| | | | | 303/9.67 |
| 2023/0047015 A1 | * | 2/2023 | Ganzel ................. | B60T 8/4081 |

* cited by examiner

*Primary Examiner* — Robert A. Siconolfi
*Assistant Examiner* — San M Aung
(74) *Attorney, Agent, or Firm* — Tarolli, Sundheim, Covell & Tummino LLP

(57) ABSTRACT

A venting valve includes a bore lumen. An MC valve passage is in fluid communication with the bore lumen. A venting fluid passage is in fluid communication with the bore lumen at a location spaced from the MC valve passage. An SCA valve passage is in fluid communication with the bore lumen at a location between the MC valve passage and the venting fluid passage. A venting valve shuttle moves between first and second shuttle positions at least partially responsive to fluid pressure. Shifting of the venting valve shuttle toward the second shuttle position urges air from the bore lumen into the ambient space via the venting fluid passage.

20 Claims, 4 Drawing Sheets

VENTED VALVE AND BRAKE SYSTEM USING SAME

RELATED APPLICATION

This application claims priority from U.S. Provisional Application No. 63/450,461 filed 7 Mar. 2023, from U.S. Provisional Application No. 63/449,670 filed 3 Mar. 2023, and from U.S. Provisional Application No. 63/449,464 filed 2 Mar. 2023, the subject matter of all of which is incorporated herein by reference in its entirety, for all purposes.

This application is related to the technologies disclosed in one or more of U.S. Provisional Patent Application No. 63/518,687, filed concurrently herewith and titled "PUSH THRU SCA"; U.S. patent application Ser. No. 18/447,490, filed concurrently herewith and titled "Brake Systems with Master Cylinders and Single Corner Actuators"; U.S. patent application Ser. No. 18/447,541, filed concurrently herewith and titled "Brake Systems with Motor-Driven Master Cylinders and Electric Secondary Power Transmission Units"; U.S. patent application Ser. No. 18/447,566, filed concurrently herewith and titled "Brake Systems with Motor-Driven Master Cylinders and Wheel-Side Pressure Sensors"; and U.S. patent application Ser. No. 18/447,642, filed concurrently herewith and titled "Bleed Valve and Brake Systems Using Same"; the entire contents of all of which are incorporated herein by reference for all purposes.

TECHNICAL FIELD

This disclosure relates to an apparatus and method for use of a bleed valve, and, more particularly, to methods and apparatus of bleed valves and brake systems using same.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", in U.S. Patent Application Publication No. 2020/0307538, published 1 Oct. 2020 by Blaise Ganzel and titled "Brake System with Multiple Pressure Sources", and in U.S. patent application Ser. No. 17/400,250, filed 12 Aug. 2021 by Blaise Ganzel and titled "Apparatus and Method for Control of a Hydraulic Brake System Including Manual Pushthrough", all of which are incorporated herein by reference in their entirety for all purposes.

SUMMARY

In an aspect, a venting valve is described. An elongate venting valve bore has longitudinally spaced first and second bore ends, with a bore lumen extending between the first and second bore ends. The venting valve bore is at least partially defined by a venting valve body. An MC valve passage is in fluid communication with the bore lumen adjacent the first bore end. The MC valve passage is configured to selectively place the bore lumen in fluid communication with a master cylinder selectively transmitting pressurized hydraulic fluid through the venting valve. A venting fluid passage is in fluid communication with the bore lumen at a location spaced longitudinally from the MC valve passage. An SCA valve passage is in fluid communication with the bore lumen at a location longitudinally interposed between the MC valve passage and the venting fluid passage. The SCA valve passage is configured to selectively place the bore lumen in fluid communication with a single corner actuator selectively transmitting pressurized hydraulic fluid through the venting valve along a valve fluid path extending through a portion of the bore lumen and linking the MC valve passage and the SCA valve passage. An elongate venting valve shuttle extends partially through the bore lumen for selective longitudinal reciprocal motion at least partially between the first and second bore ends between first and second shuttle positions at least partially responsive to fluid pressure along the valve fluid path. The venting valve shuttle has longitudinally spaced first and second shuttle ends, with the second shuttle end selectively located longitudinally adjacent the second bore end. A valve ball is located in the valve bore and is interposed longitudinally between the venting valve shuttle and the first bore end. The valve ball is selectively engaged with a valve seat defined by the valve bore to selectively occlude the valve fluid path responsive to a predetermined fluid pressure at the SCA valve passage and to maintain the valve fluid path responsive to at least one of the predetermined fluid pressure at the SCA valve passage and a predetermined fluid pressure at the MC valve passage. The venting valve shuttle shifts longitudinally toward the second shuttle position responsive to presence of a predetermined hydraulic pressure level within the bore lumen along the venting valve fluid path. Shifting of the venting valve shuttle toward the second shuttle position is operative to urge air from the bore lumen into the ambient space via the venting fluid passage. The valve ball engages with the valve seat at least partially responsive to shifting of the venting valve shuttle toward the second shuttle position. Shifting of the venting valve shuttle toward the first shuttle position is operative to urge air into the bore lumen from the ambient space via the venting fluid passage.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
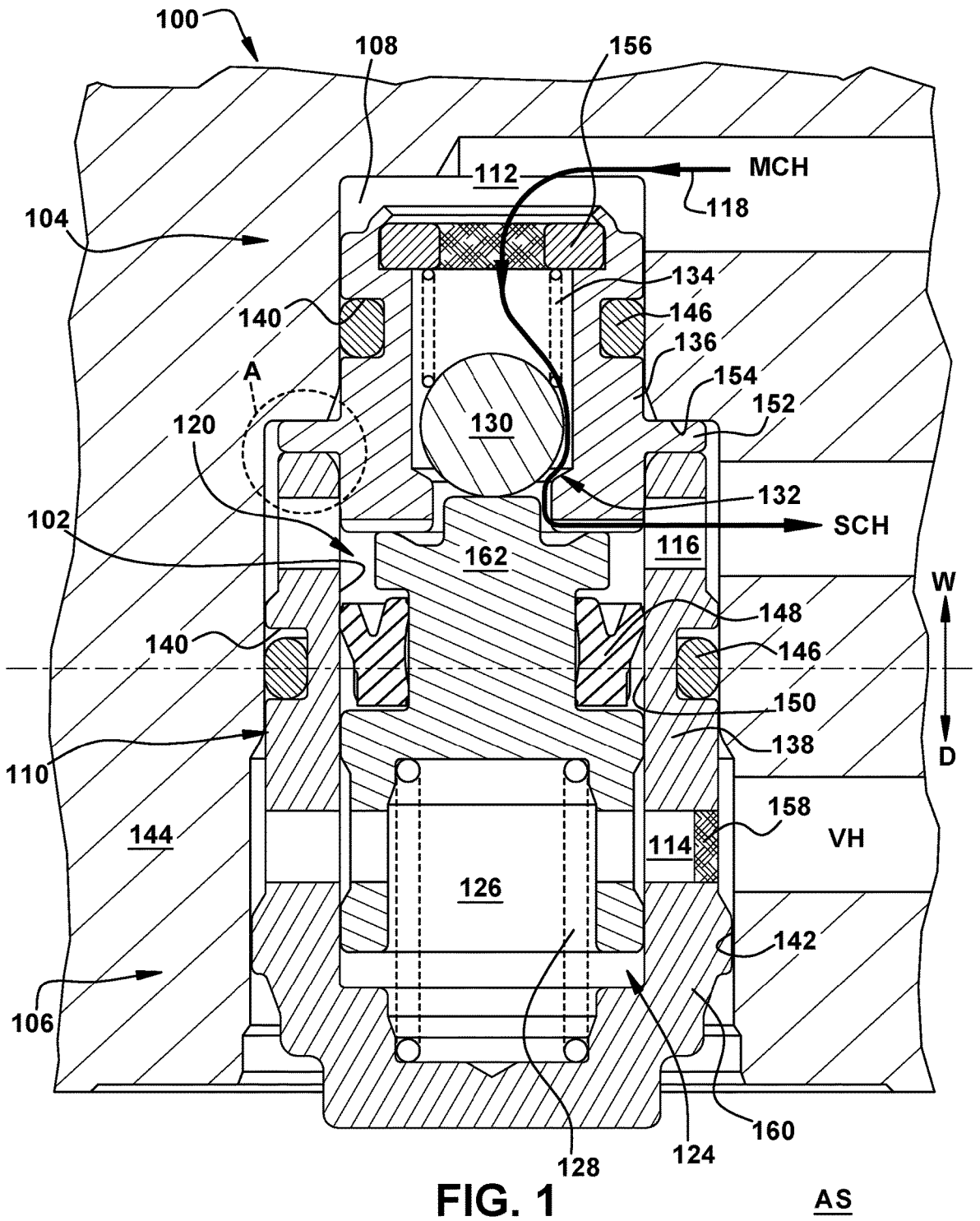
FIG. 1 is a schematic cross-sectional view of a venting valve according to an aspect of the present invention, in a first configuration.

FIG. 1 schematically depicts a cross-sectional view of a venting valve 100. An elongate venting valve bore 102 has longitudinally spaced first and second bore ends 104 and 106, respectively. The term "longitudinally" is used herein to indicate a direction coincident with the venting valve bore 102, substantially vertical in the orientation of FIG. 1, and indicated by arrow "L" in FIG. 1. A bore lumen 108 extends between the first and second bore ends 104 and 106. The venting valve bore 102 is at least partially defined by a venting valve body 110.

An MC valve passage 112 is in fluid communication with the bore lumen 108 adjacent the first bore end 104. The MC valve passage 112 is configured to selectively place the bore lumen 108 in fluid communication with a master cylinder selectively transmitting pressurized hydraulic fluid through the venting valve 100, as will be discussed below. A venting fluid passage 114 is in fluid communication with the bore lumen 108 at a location spaced longitudinally from the MC valve passage 112. An SCA valve passage 116 is in fluid communication with the bore lumen 108 at a location longitudinally interposed between the MC valve passage 112 and the venting fluid passage 114. The SCA valve passage 116 is configured to selectively place the bore lumen 108 in fluid communication with a single corner actuator selectively transmitting pressurized hydraulic fluid through the venting valve 100, as will be discussed below. Pressurized hydraulic fluid can travel "forward" or "backward" along a valve fluid path (shown schematically at 118) extending through a portion of the bore lumen 108 and linking the MC valve passage 112 and the SCA valve passage 116.

An elongate venting valve shuttle 120 extends partially through the bore lumen 108 for selective longitudinal reciprocal motion at least partially between the first and second bore ends 104 and 106 between first and second shuttle positions (the venting valve shuttle 120 is shown in the first shuttle position in FIG. 1). This longitudinal reciprocal motion occurs at least partially responsive to fluid pressure along the valve fluid path 118. The venting valve shuttle 120 has longitudinally spaced first and second shuttle ends 122 and 124, respectively, with the second shuttle end 124 being selectively located longitudinally adjacent the second bore end 106.

The venting valve shuttle 120 may include a shuttle cavity 126 extending into the second shuttle end 124. When present, the shuttle cavity 126 may at least partially contain a spring 128 urging the venting valve shuttle 120 toward the first shuttle position (i.e., the position depicted in FIG. 1).

A valve ball 130 is located in the valve bore 102 and is interposed longitudinally between the venting valve shuttle 124 and the first bore end 104. The valve ball 130 is selectively engaged with a valve seat 132 defined by the valve bore 102 to selectively occlude the valve fluid path 118 responsive to a predetermined fluid pressure at the SCA valve passage 116. For some use environments, this predetermined fluid pressure will be slightly above atmospheric pressure—for example, it may be about 1 bar. When the valve ball 130 is (selectively) disengaged from the valve seat 132 responsive to a higher fluid pressure at the SCA valve passage 116 than at the MC valve passage 112, then pressure along the valve fluid path 118 quickly equalizes, and the MC valve passage 112 remains in fluid communication with the SCA valve passage 116, unless the fluid pressure at the SCA valve passage 116 is above a predetermined fluid pressure (e.g., about 1 bar) which could cause the valve ball 130 to return to the valve seat 132.

During use of the venting valve 100, the valve ball 130 may lift away from the valve seat 132 to allow fluid flow therepast responsive to a predetermined cracking pressure differential from the SCA valve passage 116 toward the MC valve passage 112 along the valve fluid path 118. The valve ball may be spring-biased into contact with the valve seat 132, such as through the presence of ball spring 134. In some use environments, the ball spring 134 could be relatively weak, such as by fulfilling primarily a "positioning" function to keep the valve ball 130 from incidentally becoming disengaged from the valve seat 132 during motion of the venting valve 100—in this case, the "cracking" pressure differential will be quite low. Conversely, if the ball spring 134 is chosen to strongly bias the valve ball 130 toward the valve seat 132, the SCA valve passage 116 pressure might need to be significantly higher than the MC valve passage 112 pressure in order for the valve ball 130 to permit fluid flow therepast along the valve fluid path 118. One of ordinary skill in the art can readily "tune" a desired response for the venting valve 100 fluid dynamics by accordingly selecting the spring 128, the ball spring 134, or any other components of the venting valve 100.

The venting valve body 110 may include an outer surface having at least one sealing groove 140 extending circumferentially therearound. When the venting valve body 110 is maintained within a brake system housing bore 142 of a brake system housing block 144, as will be discussed below, the at least one sealing groove 140 may include a resilient sealing member 146 interposed laterally between the brake system housing bore 142 and the venting valve body 110 to substantially occlude fluid passage therebetween, past the resilient sealing member(s) 146. The term "laterally" is used herein to indicate a direction substantially perpendicular to the longitudinal direction. As shown in the Figures, at least one sealing ring 140 may be circular, ovoid, curved, or curvilinear in cross-section and may be configured to be substantially symmetrical in cross-section, to resist fluid travel in both longitudinal directions therepast.

Similarly to "seal off" or otherwise control fluid presence at various locations inside the venting valve 100, at least one shaped sealing ring 148 may be interposed laterally between the venting valve shuttle 120 and an inner wall 150 of the bore lumen 108 at a portion of the venting valve shuttle 120 longitudinally between the SCA hydraulic passage 116 and the venting fluid passage 114. When present, the shaped sealing ring 148 may be operative to prevent passage of air therepast from the venting fluid passage 114 area toward the SCA hydraulic passage 116 area. Accordingly, the shaped sealing ring 144 may have a directional cross-sectional configuration similar to that of a known lip seal or "L"-type seal, with a "skirt" portion flaring outward from the venting valve shuttle 120 as shown in FIG. 1. While a resilient sealing ring having a more-symmetrical cross-sectional shape (similar to sealing rings 146) could be provided at the location of the depicted shaped sealing ring 148, this "lip seal" type shaped sealing ring 148 may be more durable and reliable for repeated reciprocal motion as carried by the venting valve shuttle 120. Additionally, the shaped sealing ring 148 may have a desired friction level, lower than that of a more symmetrically shaped sealing ring (e.g., sealing rings 146), which can facilitate a lower shuttle pressure for the venting valve 100 than if a symmetrical sealing ring were to be used.

The venting valve body 110 may be of a two-piece construction as shown in FIG. 1, including a first body portion 136 longitudinally aligned with a second body portion 138, which may be used to provide advantages in cost, manufacture, assembly, operation, or for any other reason. When a two-piece venting valve body 110 is provided, the first body portion 136 may define the valve seat 132, and the second body portion 138 may define the SCA valve passage 116 and the venting fluid passage 114. Similarly to the arrangement when the venting valve body 110 is a single-piece component, each of the first and second body portions 136 and 138 in a two-piece venting valve body 110 (such as that shown in FIG. 1) may include an outer surface having a sealing groove 140 extending circumferentially therearound, the sealing grooves 140 each being configured to contain a resilient sealing member 146 interposed laterally between the brake system housing bore 142 and the venting valve body 110 to substantially occlude fluid passage therepast.

However, it is contemplated that, regardless of the number of subcomponents (if any) comprising the valve body 110, any desired sealing groove(s) and corresponding resilient sealing member(s) may be provided to assist with positioning and sealing the various parts and operation of the venting valve 100 as desired, and can readily be provided by one of ordinary skill in the art.

In a two-piece venting valve body 110, the first body portion 136 may have a smaller average external diameter than an average external diameter of the second body portion 138. This is the configuration shown in FIG. 1. Here, the first body portion 136 is at least partially inserted into the second body portion 138 (via the overlap at area "A" in FIG. 1). Accordingly, the brake system housing bore 142 is "stepped" with a variable inner profile shape to accommodate the relative external diameters of the first and second body portions 136 and 138 maintained therein.

Again with reference to FIG. 1, it can be seen that the first body portion 136 of the two-piece venting valve body 110 may include a laterally extending lip 152. When present, the lip 152 may be longitudinally interposed (or "sandwiched") between the second body portion 138 and a rim area 154 of the stepped brake system housing bore 142 to maintain the first body portion 136 in position within the brake system housing bore 142. This may be helpful, for example, for facilitating assembly by having the "ball valve" first body portion 136 of the venting valve 100 (including the valve ball 130 and valve seat 132) able to be provided as a "closed" single-piece subcomponent which is dropped into an already-machined brake system housing bore 142. The second body portion 138 (including the venting valve shuttle 120) can then be inserted atop the already-placed first body portion 136. One of ordinary skill in the art can readily provide a suitably configured venting valve 100 for desired assembly and operational characteristics for a particular use environment.

At least one filter member 156 may be located along the valve fluid path 118. For example, and as shown in FIG. 1, the filter member 156 is held within a recess at the first bore end 104 of the venting valve bore 102, which may provide certain assembly advantages. It is contemplated, though, that the filter member could be located within the MC hydraulic passage 112, the SCA hydraulic passage 116, or at any other desired location along the valve fluid path 118.

A venting filter (shown schematically at 158) may be located at any point along, or in fluid communication with, the venting fluid passage. When present, the venting filter 158 may be configured to permit airflow therethrough while substantially preventing liquid flow therethrough. For example, a membrane made at least partially of Gore-Tex™, available from W. L. Gore & Associates, Inc. of Newark, Delaware, could be stretched across a "mouth" of the venting fluid passage (or an extension thereof) adjacent an ambient space outside the brake system housing block 144.

A venting valve cap 160 may selectively occlude the brake system housing bore 142 adjacent the second bore end 106. As shown in FIG. 1, the venting valve cap 160 may comprise at least a portion of the venting valve body 110, and may be, more specifically, a portion of the second body portion 138. The brake system housing bore 142 may be contiguous with an outer surface of the brake system housing block 144 which is located in the ambient space AS. The venting valve cap 160 may be mechanically engaged with an inner wall of the brake system housing bore 142 to resist egress from the brake system housing block 144. This may be accomplished, for example, by the venting valve cap 160 being staked or crimped into the brake system housing block 144 after the venting valve 100 components are placed within.

In at least partial summary of the venting valve 100 configuration and maintenance within the brake system housing block 144, it should be noted that at least one shaped sealing ring 148 is interposed laterally between the venting valve shuttle 120 and an inner wall of the bore lumen 108 at a portion of the venting valve shuttle 120 longitudinally between the SCA hydraulic passage 116 and the venting fluid passage 114. In addition, the resilient sealing member 146 is interposed laterally between the brake system housing bore 142 and the venting valve body 110 to substantially occlude fluid passage therepast. As a result, and as can be seen in FIG. 1, the at least one shaped sealing ring 148, the venting valve body 110, and the resilient sealing member 146 cooperatively separate the venting valve 110 into a wet valve area—located longitudinally between the shaped sealing ring 148 and the first bore end 104 and configured to selectively contain hydraulic fluid—and a dry valve area—located longitudinally between the shaped sealing ring 148 and the second bore end 106 and configured to be substantially devoid of hydraulic fluid. (The term "substantially devoid of hydraulic fluid" here admits of some de minimis, unintentional seepage or incursion of hydraulic fluid into the "dry valve area", in an amount insignificant to affect operation of the venting valve 100 or the larger brake system. Additionally, some grease or other substance could be applied to the "dry valve area" side of the shaped sealing ring 148 without destroying the "dry" nature of that portion of the venting valve 100.) This separation is shown by the "W" and "D" labeled sides, respectively, of the dash-dot line bisecting the venting valve 100 of FIG. 1.

In operation, then, the venting valve shuttle 120 may shift longitudinally toward the second shuttle position responsive to presence of a predetermined hydraulic pressure level within the bore lumen 108 along the venting valve fluid path 118. This second shuttle position is not shown in FIG. 1, but will include the second shuttle end 124 drawing near to, and optionally contacting, the second bore end 106. Such shifting of the venting valve shuttle 124 toward the second shuttle position is operative to urge air from the bore lumen—more specifically, from the dry valve area "D" of FIG. 1—into the ambient space via the venting fluid passage 114. The valve ball 130 engages with the valve seat 132 at least partially responsive to shifting of the venting valve shuttle 124 toward the second shuttle position.

Conversely, shifting of the venting valve shuttle 124 toward the first shuttle position (shown in FIG. 1) may be operative to urge air into the bore lumen 108 (into the dry valve area "D") from the ambient space via the venting fluid passage 114. A "nub" or stub 162 at the first shuttle end 122 may be operative to push the valve ball 130 upward, away from engagement with the valve seat 132 to allow fluid flow along the valve fluid path 118, as the venting valve shuttle 120 is pushed upward toward the first shuttle position under influence of hydraulic fluid pressure from the SCA hydraulic passage 116 sufficient to overcome the ball spring 134 force and/or hydraulic fluid pressure within the MC hydraulic passage 112.

As described immediately above, the venting valve 100 can therefore facilitate "breathing" of the brake system and thereby manage hydraulic fluid flow within the brake system in a desired manner.

One of ordinary skill in the art can readily grasp the operation of the venting valve 100 upon reference to the present disclosure, and can provide a suitable venting valve 100 arrangement for a particular use environment.

Figure 2:
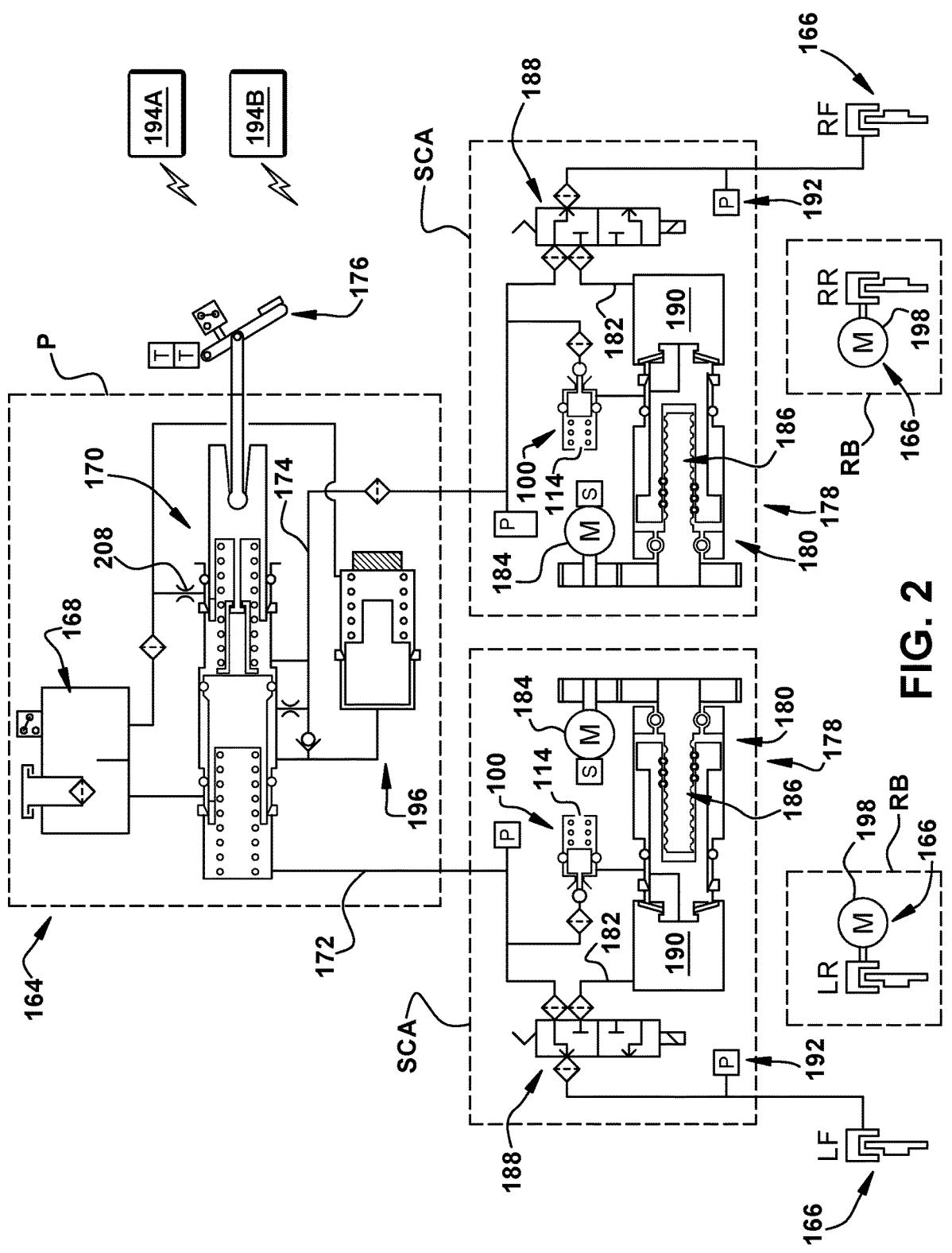
FIG. 2 is a schematic hydraulic diagram of a first brake system including the venting valve of FIG. 1.
Figure 3:
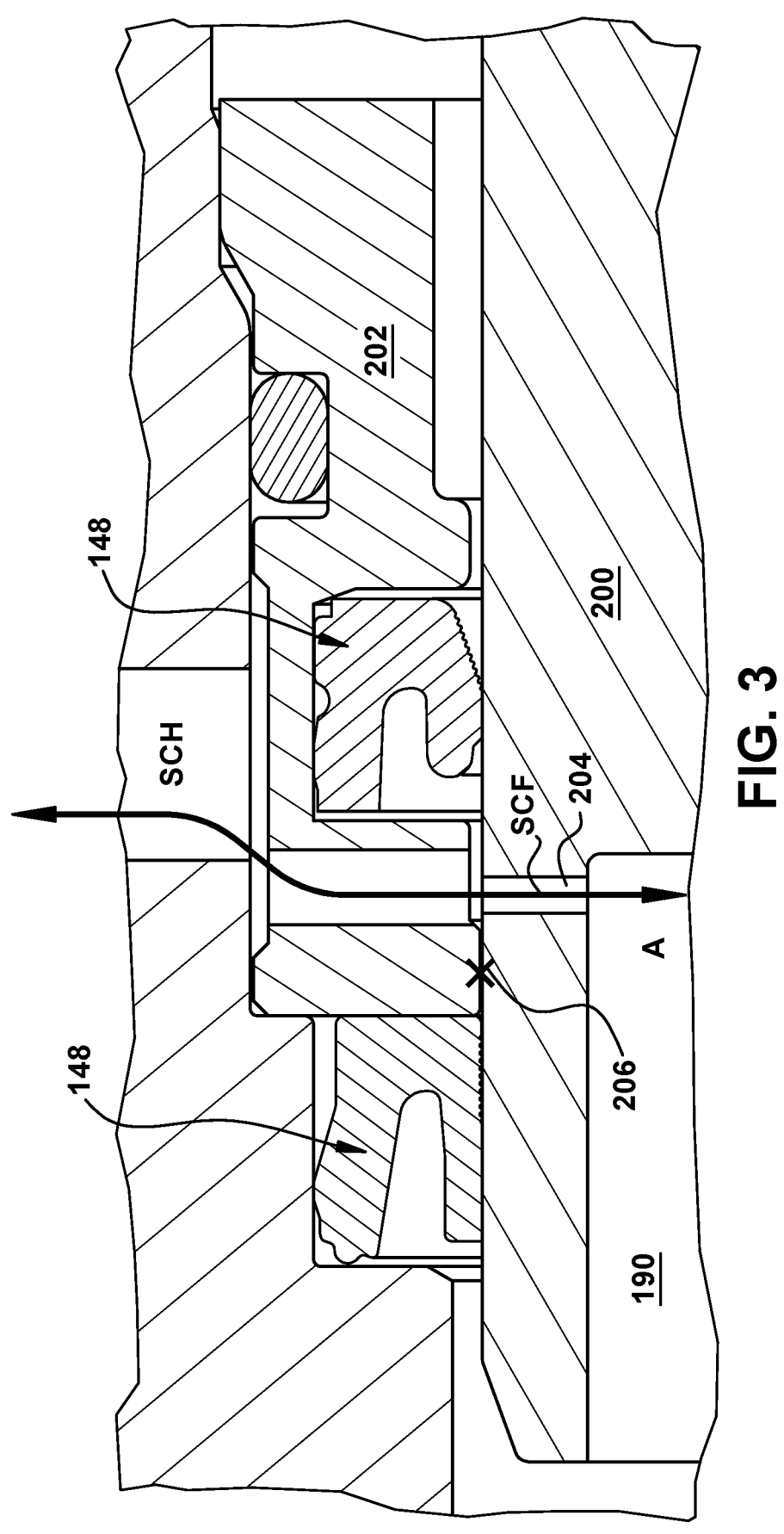
FIG. 3 is a detail view of a component of the first brake system, taken at area "3" of FIG. 4.
Figure 4:
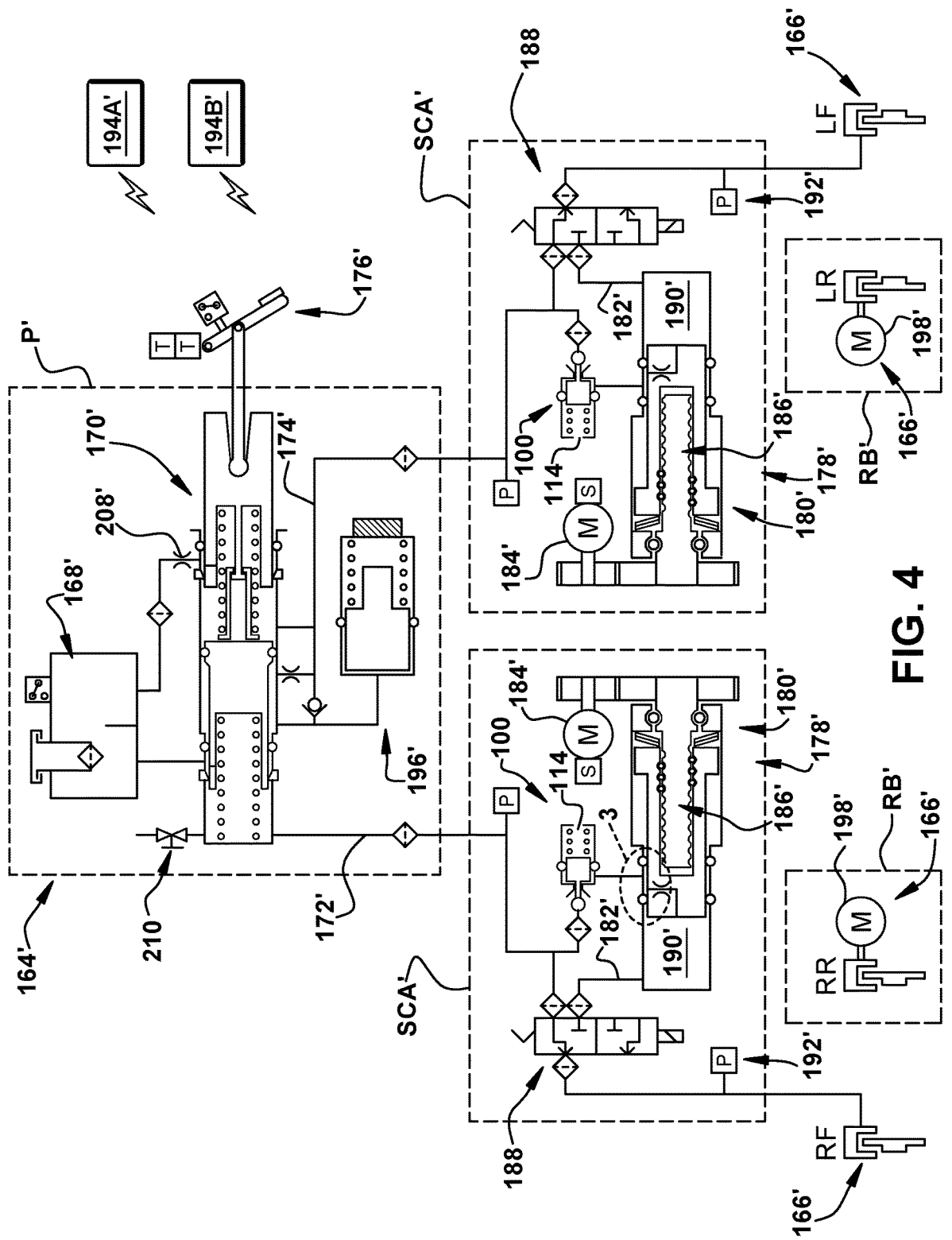
FIG. 4 is a schematic hydraulic diagram of a second brake system including the venting valve of FIG. 1.

Turning now to FIGS. 2-4, first and second brake systems 164 and 164' are depicted schematically as providing use environments for the venting valve 100 of FIG. 1. With particular reference to FIG. 2, an example first brake system 164 is provided for actuating a plurality of wheel brakes 166 comprising at least first and second wheel brakes LF and RF using the venting valve 100 is depicted. The brake system 164 is shown here as a hydraulic braking system, in which fluid pressure is utilized to apply braking forces for the brake system 164. The brake system 164 may suitably be used on a ground vehicle, such as an automotive vehicle having four wheels with a wheel brake associated with each wheel. Furthermore, the brake system 164 can be provided with other braking functions such as anti-lock braking (ABS) and other slip control features to effectively brake the vehicle. Components of the brake system 164 may be housed in one or more blocks or housings. The blocks or housings may be made from solid material, such as aluminum, that has been drilled, machined, or otherwise formed to house the various components. Fluid conduits may also be formed in the block or housing.

Each of the wheel brakes 166 may include, for example, a brake caliper mounted on the vehicle to engage a frictional element (such as a brake disc) that rotates with a vehicle wheel to effect braking of the associated vehicle wheel. The wheel brakes 166 can be associated with any combination of front and rear wheels of the vehicle in which the corresponding brake system 164 is installed. For example, the brake system 164 may be configured as a vertically split or diagonally split system. No differentiation is made herein among the wheel brakes 166, for the purposes of this description, though one of ordinary skill in the art could readily provide a suitable braking arrangement for a particular use environment.

The brake system 164 includes a reservoir 168 to store and hold hydraulic fluid for the brake system 164. A manually operable master cylinder 170 is in fluid communication with the reservoir 168 and is operable during a backup braking mode to generate pressurized hydraulic fluid at first and second MC outputs 172 and 174, respectively, for hydraulically actuating the first and second wheel brakes LF and RF, respectively. This backup braking mode is termed "manual push-through" and can result in the provision of pressurized hydraulic fluid in a known manner when other portions of the brake system 164 are not available for use for some reason. It is contemplated, though, that the master cylinder 170 may also or instead provide a "normal" resistance and "pedal feel" for a driver during a normal non-failure braking mode. The master cylinder ("MC") 170 shown in the Figures is a dual-chamber type master cylinder and is operable to generate pressurized fluid responsive to user manipulation (manual force) of a brake pedal 176 mechanically connected to the master cylinder 170.

The brake system 164 also includes a plurality of single corner actuators ("SCA") 178. Each single corner actuator 178 is hydraulically interposed between a selected one of the first and second MC outputs 172 and 174 and a corresponding one of the first and second wheel brakes LF and RF. Each SCA 178 includes a secondary power transmission unit ("PTU") 180 configured for selectively providing pressurized hydraulic fluid at an SCA output 182 for actuating the respective wheel brake in at least one of a normal non-failure braking mode and a backup braking mode. The secondary PTU 180 includes an electric PTU motor 184 configured to selectively pressurize the hydraulic fluid by transmitting rotary motion to a plunger assembly 186 of the secondary PTU 180. Each single corner actuator 178 may be indirectly fluidly connected to the reservoir 168 via the master cylinder 170, in certain configurations such as that shown in FIG. 2.

At least one two-position three-way valve 188 is included in the SCA 178 and may be interposed hydraulically between the plunger assembly 186 and the respective wheel brake LF or RF for selectively controlling provision of hydraulic fluid to the respective wheel brake LF or RF from at least one of the plunger assembly 186 and the master cylinder 170. For example, and as shown in FIGS. 2 and 4, the three-way valve 188 routes pressurized hydraulic fluid from the MC 170 (via corresponding first or second MC output 172 or 174) to the respective wheel brake LF or RF when the three-way valve 188 is de-energized—such as if the electrical portion of the brake system 164 has failed, or if such routing is desired. The three-way valve 188 can be energized to route pressurized hydraulic fluid from the secondary PTU 180 (via corresponding SCA output 182) to the respective wheel brake LF or RF, such as during the normal non-failure braking mode.

Each SCA 178 also includes a venting valve 100 such as that previously described and as shown in FIG. 1. The selected one of the first and second MC outputs 172 or 174 for that SCA 178 is in fluid connection with the MC hydraulic passage 112, and the SCA hydraulic passage 116 is in fluid communication with a plunger cavity 190 of the corresponding plunger assembly 186. For example, the venting valve body 110 may be maintained within a brake system housing bore 142 of a brake system housing block 144. The brake system housing block 144 may include an MC housing passage (MCH, in FIG. 1) placing the MC valve passage 112 in fluid communication with the master cylinder 170 (e.g., via respective first or second MC output 172 or 174), an SCA housing passage (SCH, in FIG. 1) placing the SCA valve passage 114 in fluid communication with the single corner actuator 178, and a venting housing passage (VH, in FIG. 1) placing the venting fluid passage 114 in fluid communication with an ambient space AS.

At least two brake pressure sensors 192 may be provided to the brake system 164, with each brake pressure sensor 192 being associated with a corresponding wheel brake RF or LF for sensing hydraulic pressure at the corresponding wheel brake RF or LF and responsively producing a brake pressure signal.

At least one electronic control unit ("ECU") 194 may be provided for controlling at least one of the secondary power transmission units 180 and the two-position three-way valves 188 responsive to at least one brake pressure signal, with first and second ECUs 194A, 194B being shown and described herein. The ECUs 194A, 194B may include microprocessors and other electrical circuitry. The ECUs 194A, 194B receive various signals, process signals, and control the operation of various electrical components of a corresponding brake system 164 in response to the received signals, in a wired and/or wireless manner. For example, the ECU(s) 194A and/or 194B may control at least one of the secondary power transmission unit 180 and the three-way valve 188 responsive to the braking signal generated by the brake pedal 176 of the master cylinder 170.

The ECUs 194A, 194B can be connected to various sensors such as a reservoir fluid level sensor, pressure sensors, travel sensors, switches, wheel speed sensors, and steering angle sensors. The ECUs 194A, 194B may also be connected to an external module (not shown) for receiving information related to yaw rate, lateral acceleration, longitudinal acceleration of the vehicle, or other characteristics of vehicle operation for any reason, such as, but not limited to, controlling the brake system 164 during vehicle braking, stability operation, or other modes of operation. Additionally, the ECUs 194A, 194B may be connected to the instrument cluster for collecting and supplying information related to warning indicators such as an ABS warning light, a brake fluid level warning light, and a traction control/vehicle stability control indicator light. It is contemplated that at least one of the ECUs 194A and 194B may be, for example, integrated into at least one of the secondary PTUs 180.

When there are two ECUs provided to the brake system 164, the first ECU 194A may be operative to control the electric PTU motor 184 of a selected SCA 178, and any desired one(s) of the three-way valves 188. The second ECU 194B may be operative to control the electric PTU motor 184 of another SCA 178, and any desired one(s) of the three-way valves 188. One of ordinary skill in the art can readily provide a brake system 164 having desired ECU 194 properties and redundancy for a particular use environment.

An example of a suitable ECU 194 arrangement is disclosed in co-pending U.S. patent application Ser. No. 17/708,019, filed 30 Mar. 2022 and titled "Control Arrangement for a Brake System", which is incorporated by reference herein in its entirety for all purposes.

A brake simulator (shown generally at 196) may be provided in hydraulic connection to the master cylinder 170 and (optionally directly, as in FIG. 2) to the reservoir 168 for providing desired brake pedal response, assisting with routing hydraulic fluid between other components of the brake system 164, or for any other reason. One of ordinary skill in the art can readily configure a suitable brake simulator 196 for a particular use environment.

Operation of the brake system 164 as pertains to the venting valve 100 will now be discussed in detail. In general, the venting valve shuttle 120 is urged toward the second shuttle position responsive to hydraulic pressure being at a predetermined fluid pressure at the SCA hydraulic passage 116 (e.g., a pressure above about 1 bar). The venting valve shuttle 120 is urged toward the first shuttle position (as shown in FIG. 1) responsive to hydraulic pressure being at a predetermined fluid pressure at a chosen one of the SCA hydraulic passage 116 (e.g., a pressure below about 1 bar) and the MC hydraulic passage 112—this may occur, for example, to allow a portion of thermally expanded fluid in the SCA 178 to return to the reservoir 168.

Motion of the venting valve shuttle 120 of the venting valve 100 into the second shuttle position limits flow of hydraulic fluid through a respective single corner actuator 178 and accordingly to a corresponding wheel brake 166, and is operative to maintain a fluid flow between the master cylinder 170 and the brake simulator 196. That is, the venting valve shuttle 120 reciprocates longitudinally between the first and second shuttle positions to avoid having more than a predetermined amount of pressurized hydraulic fluid flow through the SCA 178 and out to the corresponding wheel brake 166 because doing so will cut off the brake simulator 196 from the rest of the brake system 164 due to travel of certain other plungers and shuttles in other brake system 164 components. When the brake simulator 196 is hydraulically isolated in this manner, even temporarily, then the hydraulic fluid within the brake simulator 196 is not available to the rest of the brake system 164, and the brake pedal 176 may suddenly become very stiff or "hard", leading to user discomfort.

As another feature of the brake system 164 facilitated by the venting valve 100, the valve ball 130 and valve seat 132 can be considered to collectively functionally comprise an "SCA check valve" located in the single corner actuator 178 adjacent the venting valve shuttle 120 as part of the venting valve 100. When the valve ball 130 and valve seat 132 (and optionally ball spring 134) are defined as such, the resultant "SCA check valve" is hydraulically interposed between the venting valve shuttle 120 and the master cylinder 170 along (i.e., in fluid communication with) a respective first or second MC output 172 or 174. The SCA check valve can then act cooperatively with the venting valve shuttle 120, with the "breathing" function previously mentioned, to provide a low pressure relief function to the respective single corner actuator 178. Moreover, release of the brake pedal 176 by the user can allow the "SCA check valve" function of the venting valve 100 to operate—e.g., the SCA check valve could be opened by the venting valve shuttle 120 to allow more fluid to refill any "void" in the SCA 178 or the wheel brake 166 caused by a predetermined amount of wearing away of the brake pad—the so-called "Nurburgring scenario", where the vehicle is operated continuously for a long enough period of time that a predetermined amount of pad wear occurs without the vehicle being permitted to shut down and "cycle" to refill the brakes in a commonly known manner.

The venting valve 100 may facilitate venting of the brakes 166 to the atmosphere (ambient space AS) any time that the user is not applying force to the brake pedal 176, without the need to de-energize the two-position three-way valve 188. The venting valve 100 may also be used to obviate the need for a powered evac/fill during manufacture or maintenance of the brake system 164 in a circuit having a three-way valve 188, such as those shown in FIGS. 2 and 4—the venting valve 100 won't close unless there's pressure developed within the brake system 164.

In the brake system 164 of FIG. 2, an orifice 208 is shown as being hydraulically interposed between the reservoir 168 and a selected chamber of the dual-chamber master cylinder 170. The orifice 208 can be used in combination with the SCA 178 associated with that selected chamber to energize the chamber and provide a simulator test valve function to the brake system 164. I.e., the master cylinder 170 is able to test itself without requiring manual push-through when the corresponding SCA 178 is actuated, due to the reduced-diameter orifice 208.

FIG. 3 schematically depicts area "3" of FIG. 4 with a plunger 200 of the plunger assembly 186 of the secondary power transmission unit 180 being depicted in a fully retracted position (e.g., during an evac/fill operation). The shaped sealing rings 148 shown in FIG. 3 resist fluid flow in both directions, and resist a high pressure drop from left to right (in the orientation of FIG. 3). At least one of the shaped sealing rings 148 (here, the rightmost one) is carried by bearing ring 202 of the plunger assembly 186. An SCA fluid path "SCF" is defined from the SCA housing passage SCH, through an aperture in the bearing ring 202, and through orifice 204 of the plunger 200 to place the SCA housing passage SCH in fluid communication with the plunger cavity 190. Once the plunger 200 moves in actuation direction "A" (toward the left, in the orientation of FIG. 3), the orifice 204 will be largely blocked by the "X" marked land 206 of the bearing ring 202. However, there still will be an extremely small fluid path for fluid from the plunger cavity 190 to pass through the orifice 204, between the land 206 of the bearing ring 202 and an outer surface of the plunger 200, and out to the venting valve 100 through SCA housing passage SCH. (It should be noted that a plurality of orifices 204, such as two spaced 180 degrees apart around the plunger 200, could be provided to increase the chances of one of them always being open.) This may occur, for example, when there is thermal expansion within the plunger cavity 190. Regardless of the reason for that tiny amount of emission through the orifice 204 toward the venting valve 100, the pressurized hydraulic fluid thus routed to the venting valve 100 can be sufficient to help urge the venting valve shuttle toward a desired shuttle position.

Each of the single corner actuators 178 may be carried by a respective SCA housing (which can be the same as the brake system housing block 144 previously discussed with particularity as corresponding to the venting valve 100), which is depicted schematically by dashed lines "SCA" in FIGS. 2 and 4. The reservoir 168 and master cylinder 170 may be collectively carried by a primary housing, which is depicted schematically by dashed line "P" in FIGS. 1 and 4. The primary housing and each SCA housing may all be spaced mutually apart from one another. It is contemplated that each SCA housing may be located immediately adjacent a corresponding wheel brake RF or LF, as desired.

As shown in FIGS. 2 and 4, the brake system 164 may include third and fourth wheel brakes 166, labeled as LR and RR, respectively. Each of the third and fourth wheel brakes LR and RR may be actuated by at least one of an electric brake motor 198 and an additional, separately provided single corner actuator (not shown, but substantially similar to the SCAs 178 discussed above and shown as associated with the first and second wheel brakes LF and RF in the Figures. The third and fourth wheel brakes LR and RR, and/or their associated electric brake motor 198 and/or single corner actuator(s) may be housed in separate rear brake housings (depicted schematically by dashed lines "RB" in FIGS. 2 and 4), which may be spaced apart form the primary housing and each SCA housing.

FIG. 4 illustrates a second example embodiment of a brake system 164. The brake system 164' of FIG. 4 is similar to the brake system 164 of FIGS. 2-3 and therefore, structures of FIG. 4 that are the same as or similar to those described with reference to FIGS. 2-3 have the same reference numbers with the addition of a "prime" mark. Description of common elements and operation similar to those in the previously described first embodiment will not be repeated with respect to the second embodiment, but should instead be considered to be incorporated below by reference as appropriate.

In the brake system 164' of FIG. 4, the reservoir 168' is indirectly connected to the brake simulator 196' through one or both of the dual chambers of the master cylinder 170. The brake system 164' of FIG. 4 is shown as including a bleed screw 210 at a system high point hydraulically adjacent the master cylinder 170. When present, the bleed screw 210 may be selectively operable (e.g., opened) to release air from at least one hydraulic line of the brake system 164' during a service bleed of the brake system. I.e., the bleed screw 210 allows for air removal from the secondary circuit—as shown in FIG. 4—corresponding to the second chamber of the master cylinder 170. However, the bleed screw 210 will be closed for evac/fill as desired, such as during initial construction of the brake system 164', and/or during routine maintenance and repair work.

It is contemplated that various other components, such as electric service and/or parking brake motors, could be provided by one of ordinary skill in the art to achieve desired configurations for particular use environments, in any of the brake systems described herein. For example, while a number of filters and pressure sensors are shown in the Figures, specific description thereof has been omitted herefrom for brevity, as one of ordinary skill in the art will readily understand how to provide a desired number, placement, and/or operation of filters, sensors, and any other components as desired for a particular use environment of the present invention.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A venting valve, comprising:
an elongate venting valve bore having longitudinally spaced first and second bore ends, with a bore lumen extending between the first and second bore ends, the venting valve bore being at least partially defined by a venting valve body;
an MC valve passage in fluid communication with the bore lumen adjacent the first bore end, the MC valve passage being configured to selectively place the bore lumen in fluid communication with a master cylinder selectively transmitting pressurized hydraulic fluid through the venting valve;
a venting fluid passage in fluid communication with the bore lumen at a location spaced longitudinally from the MC valve passage;
an SCA valve passage in fluid communication with the bore lumen at a location longitudinally interposed between the MC valve passage and the venting fluid passage, the SCA valve passage being configured to selectively place the bore lumen in fluid communication with a single corner actuator selectively transmitting pressurized hydraulic fluid through the venting valve along a valve fluid path extending through a portion of the bore lumen and linking the MC valve passage and the SCA valve passage;
an elongate venting valve shuttle extending partially through the bore lumen for selective longitudinal reciprocal motion at least partially between the first and second bore ends between first and second shuttle positions at least partially responsive to fluid pressure along the valve fluid path, the venting valve shuttle having longitudinally spaced first and second shuttle ends, with the second shuttle end selectively located longitudinally adjacent the second bore end; and
a valve ball located in the valve bore and interposed longitudinally between the venting valve shuttle and the first bore end, the valve ball being selectively engaged with a valve seat defined by the valve bore to selectively occlude the valve fluid path responsive to a predetermined fluid pressure at the SCA valve passage and to maintain the valve fluid path responsive to at least one of the predetermined fluid pressure at the SCA valve passage and a predetermined fluid pressure at the MC valve passage;
wherein the venting valve shuttle shifts longitudinally toward the second shuttle position responsive to presence of a predetermined hydraulic pressure level within the bore lumen along the venting valve fluid path, shifting of the venting valve shuttle toward the second shuttle position being operative to urge air from the bore lumen into the ambient space via the venting fluid passage;
wherein the valve ball engages with the valve seat at least partially responsive to shifting of the venting valve shuttle toward the second shuttle position; and
wherein shifting of the venting valve shuttle toward the first shuttle position is operative to urge air into the bore lumen from the ambient space via the venting fluid passage.

2. The venting valve of claim 1, wherein the venting valve body includes a first body portion longitudinally aligned with a second body portion, the first body portion defining the valve seat, and the second body portion defining the SCA valve passage and the venting fluid passage, and wherein each of the first and second body portions includes an outer surface having a sealing groove extending circumferentially therearound.

3. The venting valve of claim 2, wherein the venting valve body is maintained within a brake system housing bore, and each sealing groove includes a resilient sealing member interposed laterally between the brake system housing bore and the venting valve body to substantially occlude fluid passage therepast.

4. The venting valve of claim 2, wherein the first body portion has a smaller average external diameter than an average external diameter of the second body portion, the first body portion is at least partially inserted into the second body portion, and the brake system housing bore is stepped to accommodate the external diameters of the first and second body portions maintained therein.

5. The venting valve of claim 4, wherein the first body portion includes a laterally extending lip which is longitudinally interposed between the second body portion and a rim area of the stepped brake system housing bore to maintain the first body portion in position within the brake system housing bore.

6. The venting valve of claim 1, wherein the venting valve body is maintained within a brake system housing bore of a brake system housing block, the brake system housing block including an MC housing passage placing the MC valve passage in fluid communication with the master cylinder, an SCA housing passage placing the SCA valve passage in fluid communication with the single corner actuator, and a venting housing passage placing the venting fluid passage in fluid communication with an ambient space.

7. The venting valve of claim 1, wherein the venting valve body includes an outer surface having at least one sealing groove extending circumferentially therearound, and the venting valve body is maintained within a brake system housing bore of a brake system housing block, the at least one sealing groove including a resilient sealing member interposed laterally between the brake system housing bore and the venting valve body to substantially occlude fluid passage therepast.

8. The venting valve of claim 7, wherein a venting valve cap selectively occludes the brake system housing bore adjacent the second bore end, the venting valve cap being mechanically engaged with an inner wall of the brake system housing bore to resist egress from the brake system housing block.

9. The venting valve of claim 1, wherein the valve ball is spring-biased into contact with the valve seat, and wherein the valve ball lifts away from the valve seat to allow fluid flow therepast responsive to a predetermined cracking pressure differential from the SCA valve passage toward the MC valve passage along the valve fluid path.

10. The venting valve of claim 1, including at least one filter member located along the valve fluid path.

11. The venting valve of claim 1, including a venting filter in fluid communication with the venting fluid passage, the venting filter being configured to permit airflow therethrough while substantially preventing liquid flow therethrough.

12. The venting valve of claim 1, wherein at least one shaped sealing ring is interposed laterally between the venting valve shuttle and an inner wall of the bore lumen at a portion of the venting valve shuttle longitudinally between the SCA hydraulic passage and the venting fluid passage, the shaped sealing ring being operative to prevent passage of air therepast toward the SCA hydraulic passage.

13. The venting valve of claim 7, wherein at least one shaped sealing ring is interposed laterally between the venting valve shuttle and an inner wall of the bore lumen at a portion of the venting valve shuttle longitudinally between the SCA hydraulic passage and the venting fluid passage and wherein the at least one shaped sealing ring, the venting valve body, and the resilient sealing member cooperatively separate the venting valve into a wet valve area, located longitudinally between the shaped sealing ring and the first bore end and configured to selectively contain hydraulic fluid, and a dry valve area, located longitudinally between the shaped sealing ring and the second bore end and configured to be substantially devoid of hydraulic fluid.

14. The venting valve of claim 1, wherein the venting valve shuttle includes a shuttle cavity extending into the second shuttle end, the shuttle cavity at least partially containing a spring urging the venting valve shuttle toward the first shuttle position.

15. A brake system for actuating a plurality of wheel brakes comprising at least first and second wheel brakes, the system comprising:
   a reservoir;
   a master cylinder in fluid communication with the reservoir and operable during a backup braking mode to generate pressurized hydraulic fluid at first and second MC outputs for hydraulically actuating the first and second wheel brakes, respectively, responsive to user manipulation of a brake pedal mechanically connected to the master cylinder, the master cylinder being a dual-chamber master cylinder;
   a brake simulator in fluid communication with at least one of the first and second MC outputs and with the reservoir for providing predetermined brake pedal response to the user;
   a plurality of single corner actuators, each single corner actuator being hydraulically interposed between a selected one of the first and second MC outputs and a corresponding one of the first and second wheel brakes, each single corner actuator including
      a secondary power transmission unit configured for selectively providing pressurized hydraulic fluid at an SCA output for actuating the respective wheel brake in at least one of a normal non-failure braking mode and a backup braking mode, the secondary power transmission unit including an electric PTU motor configured to selectively pressurize the hydraulic fluid by transmitting rotary motion to a plunger assembly of the secondary power transmission unit;
      at least one two-position three-way valve interposed hydraulically between the plunger assembly and the respective wheel brake for selectively controlling provision of hydraulic fluid to the respective wheel brake from at least one of the plunger assembly and the master cylinder; and
      a venting valve according to claim 1, wherein the selected one of the first and second MC outputs is in fluid communication with the MC hydraulic passage and the SCA hydraulic passage is in fluid communication with a plunger cavity of the plunger assembly, wherein the venting valve shuttle is urged toward the second shuttle position responsive to hydraulic pressure being at a predetermined fluid pressure at the SCA hydraulic passage and wherein the venting valve shuttle is urged toward the first shuttle position responsive to hydraulic pressure being at a predetermined fluid pressure at a chosen one of the SCA hydraulic passage and the MC hydraulic passage;
   at least two brake pressure sensors, each brake pressure sensor associated with a corresponding wheel brake for sensing hydraulic pressure at the corresponding wheel brake and responsively producing a brake pressure signal; and an electronic control unit for controlling at least one of the secondary power transmission unit and the master cylinder responsive to at least one brake pressure signal;

wherein each single corner actuator is indirectly fluidly connected to the reservoir via the master cylinder.

16. The brake system of claim 15, including third and fourth wheel brakes, each of the third and fourth wheel brakes being actuated by at least one of an electric brake motor and a single corner actuator.

17. The brake system of claim 15, wherein each of the single corner actuators is carried by a respective SCA housing, the reservoir and master cylinder are collectively carried by a primary housing, and the primary housing and each SCA housing are all spaced mutually apart from one another.

18. The brake system of claim 15, wherein motion of the venting valve shuttle of the venting valve into the second shuttle position limits flow of hydraulic fluid through a respective single corner actuator and accordingly to a corresponding wheel brake, and is operative to maintain fluid flow between the master cylinder and the brake simulator.

19. The brake system of claim 15, wherein the valve ball and valve seat collectively comprise an SCA check valve located in the single corner actuator adjacent the venting valve shuttle as part of the venting valve, the SCA check valve being hydraulically interposed between the venting valve shuttle and the master cylinder along a respective first or second MC output, the SCA check valve acting cooperatively with the venting valve shuttle to provide a low pressure relief function to the respective single corner actuator.

20. The brake system of claim 15, wherein the reservoir is indirectly connected to the brake simulator, the brake system including a bleed screw at a system high point hydraulically adjacent the master cylinder, the bleed screw being selectively operable to release air from at least one hydraulic line of the brake system during service bleed of the brake system.

* * * * *